US007358480B2

(12) United States Patent
Mullet et al.

(10) Patent No.: US 7,358,480 B2
(45) Date of Patent: Apr. 15, 2008

(54) SYSTEM AND METHOD FOR RE-SYNCHRONIZING AN ACCESS BARRIER WITH A BARRIER OPERATOR

(75) Inventors: Willis J. Mullet, Gulf Breeze, FL (US); Paul J. VanDrunen, Navarre, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 103 days.

(21) Appl. No.: 11/359,128

(22) Filed: Feb. 21, 2006

(65) Prior Publication Data

US 2007/0194218 A1 Aug. 23, 2007

(51) Int. Cl.
*G01D 5/34* (2006.01)
*H02P 1/00* (2006.01)

(52) U.S. Cl. .................. 250/231.13; 318/280; 318/466

(58) Field of Classification Search ....................... 250/231.13–231.18; 318/280, 466
See application file for complete search history.

(56) References Cited

U.S. PATENT DOCUMENTS 4,338,553 A 7/1982 Scott, Jr. .................... 318/266
4,567,416 A 1/1986 Brunier-Coulin ............ 318/602
4,922,168 A 5/1990 Waggamon et al. ........ 318/286
5,929,580 A 7/1999 Mullet et al. ............... 318/466
6,326,751 B1 12/2001 Mullet et al. ............... 318/434
6,376,832 B1 * 4/2002 Smith et al. ........... 250/231.14
6,895,355 B2 5/2005 Fitzgibbon .................. 702/145
6,924,615 B2 8/2005 Cavarec et al. ............. 318/466
6,940,240 B2 9/2005 Kelkhoff et al. ............ 318/282

FOREIGN PATENT DOCUMENTS

DE 44 07 919 A1 9/1995

* cited by examiner

*Primary Examiner*—Thanh X Luu
(74) *Attorney, Agent, or Firm*—Renner Kenner Greive Bobak Taylor & Weber

(57) ABSTRACT

A system for re-synchronizing an access barrier with a barrier operator comprises an access barrier, and a barrier operator to profile and monitor the manual and automatic movements of the access barrier. The barrier operator comprises a controller, a memory, a motor pivot encoder, and a counting encoder. The memory contains a primary counter to store the distance measured by the counting encoder, while a secondary counter maintains a value equal to the travel of the access barrier as determined by a profiling operation initiated prior to operating the barrier operator. The controller takes into account the counts of the primary and secondary counters, along with the stored profile information, allows the re-synchronization system to determine the proper amount of movement to be applied to open or close the access barrier, in the event the access barrier has been manually moved.

21 Claims, 9 Drawing Sheets

SYSTEM AND METHOD FOR RE-SYNCHRONIZING AN ACCESS BARRIER WITH A BARRIER OPERATOR

TECHNICAL FIELD

Generally, the present invention relates to motorized barrier operators that move access barriers between limit positions. Specifically, the present invention relates to a system for re-synchronizing an access barrier with a barrier operator so that a position of the access barrier between open and closed positions is always known. Particularly, the present invention relates to a system and method of re-synchronizing an access barrier with a barrier operator, such that normal operation of the barrier operator can resume after the access barrier has been manually repositioned.

BACKGROUND

Typical barrier operators use a variety of systems to monitor the relative location of an access barrier as it moves between open and closed positions. In addition, should a user disengage the access barrier from the barrier operator, and manually move it upward or downward, the barrier operator must be capable of compensating for such movement by determining the amount of travel needed to fully open or close the access barrier when it is reactivated. However, many barrier operators have difficulty relocating the position of the access barrier, or otherwise re-synchronizing the access barrier with the barrier operator when the access barrier is manually disconnected from the operator, moved to another position and then reconnected.

In light of this problem, numerous systems have been developed. In one system, a potentiometer is connected to a drive tube of a counter-balance system of the barrier operator. During the opening or closing of the access barrier, the drive tube rotates causing the voltage potential of the potentiometer to change in relation to the position of the access barrier. However, such systems are susceptible to environmental fluctuations such as temperature change and physical wear, which leads eventually to inaccurate identification of access barrier position. Other systems utilize a pulse counting encoder, and an encoder wheel that is associated with the drive tube of the barrier operator. When the motorized operator moves the barrier, the encoder wheel rotates as the access barrier moves between open and closed positions and this rotation is detected by the pulse counting encoder. Unfortunately, if the access barrier is moved independently of the encoder wheel, such as when the access barrier is disconnected from the operator and manually moved, the positional data that identifies the relative position of the access barrier may be lost, or inaccurately characterized.

While great effort has been made to overcome some of the obstacles presented in the art, impediments to a complete success are still present. For example, in the case of the barrier operator utilizing a pulse counting encoder and encoder wheel, the initial motorized movement of the access barrier is to find a stalled condition for the purpose of resetting the encoder count. But this requires the barrier to be moved to both the open or closed position and the motor to stall out against a "hard stop." A "hard stop" occurs when the barrier is moved to its extreme physical limits. Such activity is damaging to the operator and barrier components, resulting in premature component failures.

Another attempt to overcome the obstacles presented in the art is referred to as a passpoint system as described in U.S. Pat. No. 6,895,355. In such a system, the barrier operator employs a passpoint event generator that generates a unique passpoint event as the access barrier moves between open and closed positions. When a predetermined passpoint event is detected, an incremental movement sensor is recalibrated. However, the implementation of such a passpoint system into a barrier operator may be at substantial expense, which may hamper widespread adoption of such systems.

Therefore, there is a need for a re-synchronization system for a barrier operator that allows the position of the access barrier to be identified after the access barrier has been manually disengaged from the barrier operator, moved, and reattached to the barrier operator. And there is a need for re-synchronization of the access barrier to the operator without requiring an undesirable hard stop. Still yet there is a need for a re-synchronization system for a barrier operator that is of a low cost and reliable in operation.

SUMMARY OF THE INVENTION

In light of the foregoing, it is a first aspect of the present invention to provide a system and method for re-synchronizing an access barrier with a barrier operator.

It is another aspect of the present invention to provide an operator to move an access barrier comprising a motor drive, a counterbalance system selectively engageable with the motor drive, the counterbalance system adapted to move the access barrier between limit positions when engaged by the motor drive or when moved manually, an encoder wheel associated with one of the motor drive and the counterbalance system, the encoder wheel rotating whenever the access barrier is moved, a counting encoder associated with the encoder wheel and generating a count signal when the encoder wheel is rotated, and a controller which receives the count signal and which maintains a primary count and a secondary count to determine a position of the access barrier regardless of whether the access barrier is moved by the motor drive or manually.

Yet another aspect of the present invention is to provide a re-synchronization system for an access barrier comprising a counterbalance system having a rotatable drive tube that carries an encoder wheel, the drive tube adapted to move the access barrier between limit positions, a motor drive selectively coupled to the counterbalance system, the motor drive adapted to engage the drive tube, a counting encoder to detect the movement of the encoder wheel as the access barrier moves between open and closed positions, and a controller having a memory that maintains a primary counter, a secondary counter, and a profile table containing a plurality of profiled data, the controller coupled to the counting encoder and the motor drive, wherein the primary counter stores a primary count equal to the measured travel count less a manual move count if any, and the secondary counter stores a travel distance count acquired from the profile table, wherein upon the start of each operator move, the primary count and the secondary count are decremented in accordance with the movement of the encoder wheel, the controller collecting sample data from the counting encoder, whereby after each successive decrement, the profile data corresponding to each decremented primary count and the secondary count are each compared to the sampled data, whereupon if the sampled data match the profiled data corresponding to the primary count, the operator move continues, but if the sampled data matches the profile data corresponding to the secondary count, then the primary counter is loaded with the secondary count, and the operator move of the access barrier is completed in accordance with the primary counter.

BRIEF DESCRIPTION OF THE DRAWINGS

This and other features and advantages of the present invention will become better understood with regard to the following description, appended claims, and accompanying drawings wherein:

FIGS. 6A-C show the barrier operator in a side elevational view further illustrating the motor pivot encoder, wherein FIG. 5A shows an obstructed position, FIG. 5B shows a barrier locked position, and FIG. 5C shows an operational position.

BEST MODE FOR CARRYING OUT THE INVENTION

Figure 1:
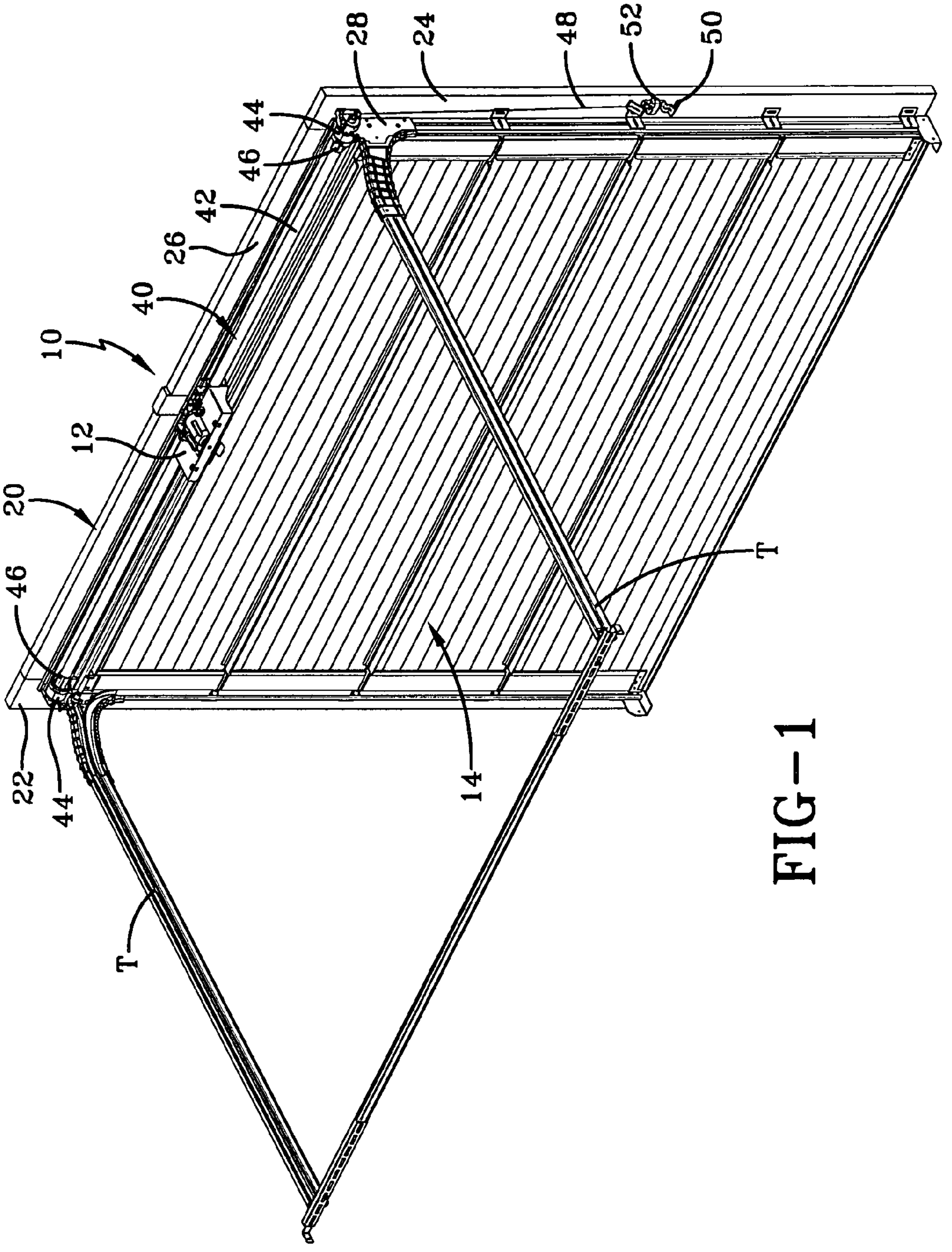
FIG. 1 is a rear perspective view of a sectional overhead garage door installation showing a barrier operator re-synchronization system according to the concepts of the present invention installed in operative relation thereto, with the barrier operator depicted in an operating position.

A re-synchronization system according to the concepts of the present invention, is generally referred to by the numeral 10 as shown in the FIGS. 1-5. The re-synchronization system 10 is part of a barrier operator 12, which is shown in FIG. 1 mounted in conjunction with an access barrier 14, such as a sectional door. While the access barrier 14 may comprise a sectional garage door commonly utilized in garages for residential housing, the barrier operator 12 and associated re-synchronization system 10 may be employed with other barriers such as curtains, awnings, gates, and the like. Moreover, the re-synchronization system 10 may be used with pivoting-type barrier operators such as the barrier operator 12 discussed herein, but should not be limited thereto, as the re-synchronization system 10 may be easily modified to be used in association with trolley-type barrier operators or jack shaft-type barrier operators to name just a few.

The opening in which the access barrier 14 is positioned for opening and closing movements relative thereto is defined by a frame 20, which is comprised of a pair of spaced jambs 22,24, which are generally parallel and extend vertically upwardly from the floor (not shown). The jambs 22,24 are spaced apart and joined at their vertical upper extremity by a header 26 to thereby delineate a generally inverted u-shaped frame around the opening of the access barrier 14. The jambs 22,24 and header 26 are normally constructed of lumber, as is well known to persons skilled in the art, for purposes of reinforcement and facilitation the attachment of elements supporting and controlling the access barrier 14, including the barrier operator 12, and the re-synchronization system 10.

Affixed to the jambs 22,24 proximate the upper extremities thereof and the lateral extremities of the header 26 to either side of the access barrier 14 which are secured to the underlying jambs 22,24 respectively. Connected to and extending from flag angles 28, are respective tracks T, which are located on either side of the access barrier 14. The tracks T define the travel of the access barrier 14 when moving upwardly from the closed to the open position, and downwardly from the open to the closed position. The barrier operator 12, may be controlled by wired or wireless transmitter devices, which provide user-functions associated therewith.

Continuing with FIG. 1, the barrier operator 12 mechanically interrelates with the access barrier 14 through a counterbalance system generally designated by the numeral 40. The counterbalance system 40, depicted herein is advantageously in accordance with pending U.S. patent application Ser. No. 11/165,138, which is assigned to the Assignee of the present invention and incorporated herein by reference. Generally, the counterbalance system 40 includes an elongated circular or non-circular drive tube 42 that extends between tensioning assemblies 44 positioned proximate each of the flag angles 28. Cable drum mechanisms 46 are positioned on the drive tube 42 proximate ends thereof, which rotate with the drive tube 42. The cable drum mechanisms 46 have a cable received thereabout, which is affixed to the access barrier 14 preferably proximate the bottom, such that rotation of the cable drum mechanisms 46 operate to open or close the door 14 in conventional fashion. A disconnect cable 48 is detachable mounted to either one of the jambs 22,24. In particular, the disconnect cable 48 has one end associated or coupled to the operator system and an opposite end terminated by a cable handle 50. A handle holder 52 is secured to either of the jambs 22,24 to hold the cable handle 50. The handle holder 52 provides at least two different positions for the cable handle so as to allow for actuation of the disconnect cable 48. The movement of the disconnect cable 48 connects and disconnects the barrier operator 12 to the counterbalance system 40 as disclosed in the '138 application.

The barrier operator 12 is mounted to the header 26, and is provided to move the access barrier 14 via the counterbalance system 40 between open and closed positions. Because the barrier operator 12 is in accordance with the barrier operator discussed in pending U.S. patent application Ser. No. 11/165,138, the mechanical features of the barrier operator 12 will not be discussed in great detail herein. However, the components of the resynchronization system 10 according to the concepts of the present invention that are used to achieve the desired operation are as discussed below.

Figure 2:
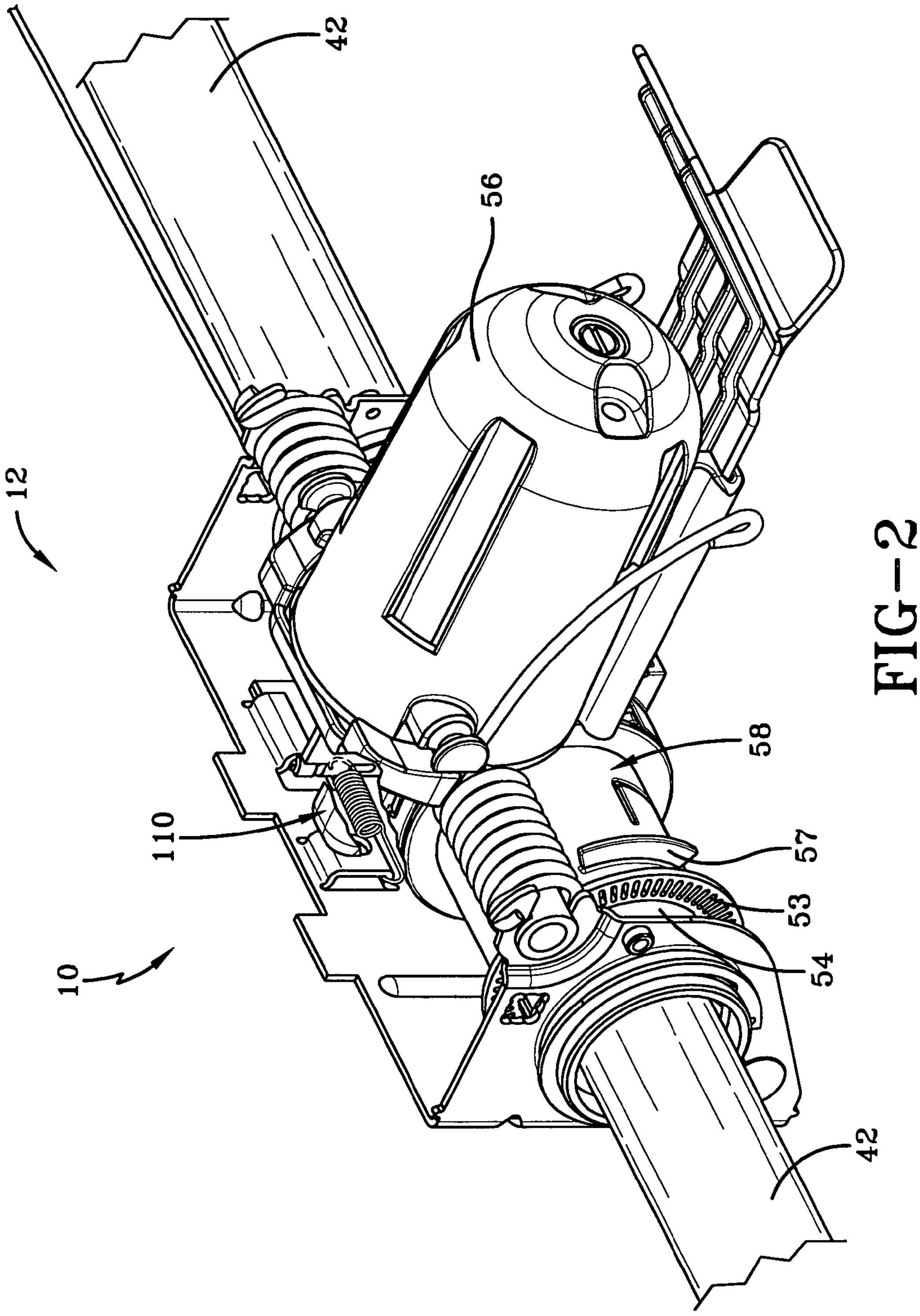
FIG. 2 is a top perspective view of the barrier operator containing a barrier re-synchronization system according to the present invention, to show the relationship between an encoder wheel and a blocker tab.
Figure 2A:
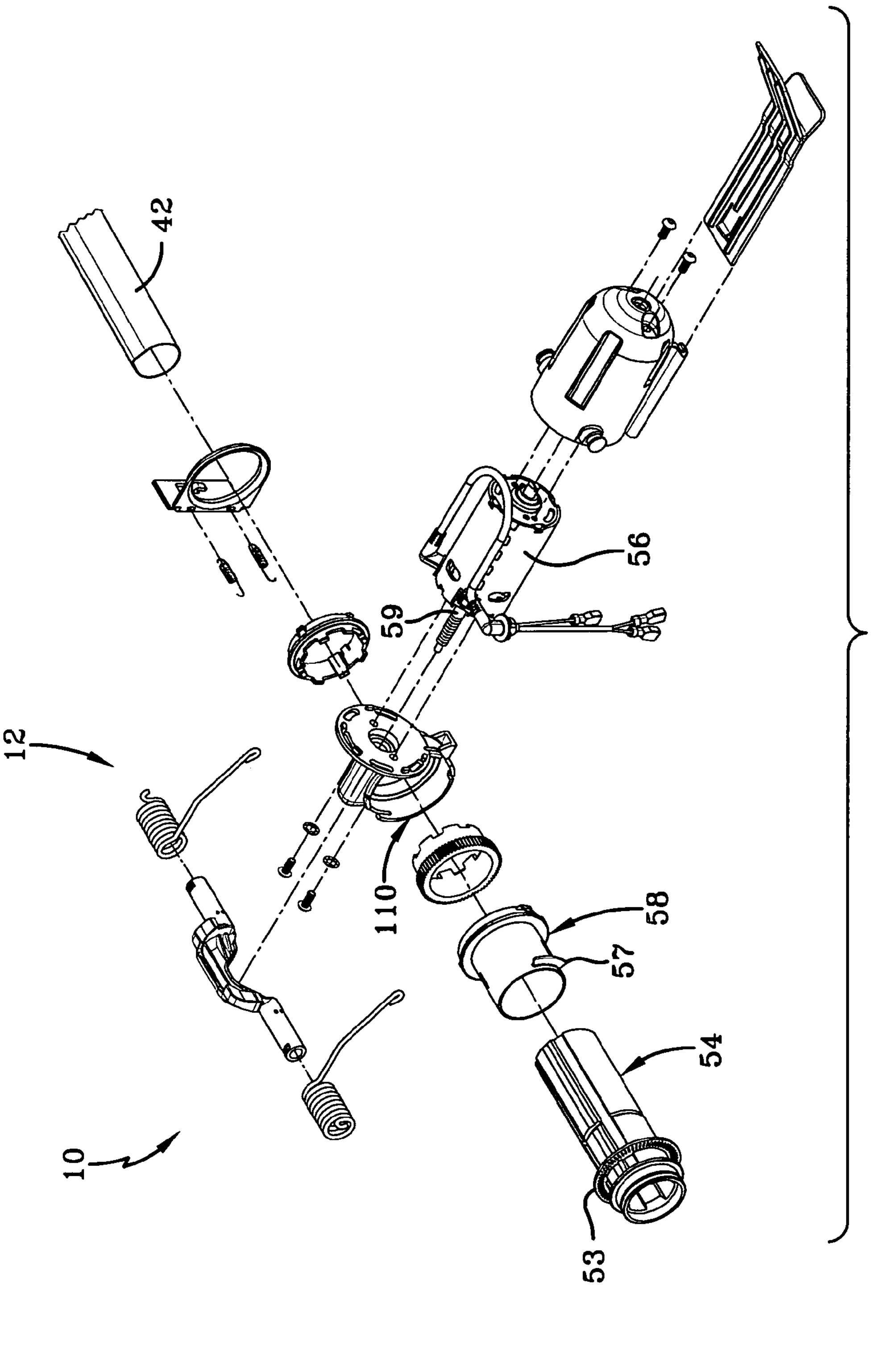
FIG. 2A is an exploded perspective view of the barrier operator shown in FIG. 2.

FIG. 2 shows an encoder wheel 53 axially positioned and attached to the drive tube 42. The encoder wheel 53 may be attached to the drive tube 42 by an encoder sleeve 54 that is configured to match the rotation of the drive tube 42. However, it is also contemplated that the encoder wheel 53 may be attached in any number of manners, and the ones discussed above should not be construed as limiting. In any event, the encoder wheel 53 comprises a plurality of evenly spaced slots 55, for example the encoder wheel 53 may use 64 slots. The encoder wheel 53 rotates as the drive tube 42 is rotated by a motor drive 56 and associated gearing of the barrier operator 12. As the encoder wheel 53 rotates, the slots 55 create a sequence of pulses that are detected by various counting encoders, which will be discussed later. As will become apparent, the encoder wheel 53 allows the re-synchronization system 10 to monitor the position and speed of the access barrier 14.

A blocker tab 57 is also provided by the counterbalance system 40. As shown in FIG. 2, the blocker tab 57 extends radially from a gear case cover 58, that along with the motor drive 56 are configured to pivot or rotate as discussed in U.S. patent application Ser. No. 11/165,138. The blocker tab 57 is configured to be used in conjunction with a motor pivot encoder, which will be elaborated on below. During operation of the barrier operator 12, the motor drive 56 rotates a shaft gear 59 which engages other gear assemblies (as discussed in U.S. patent application Ser. No. 11/165,138), which in turn rotate the encoder sleeve 54 as the access barrier 14 is moved between limit positions. In any event, the position of the blocker tab 57 relative to the motor pivot encoder changes when the access barrier 14 reaches various positions, such as an open or closed position; has contacted an obstruction, and is in an intermediate position between open and close; or when the disconnect cable 48 disconnects the operator 12 from the counterbalance system 40.

Figure 3:
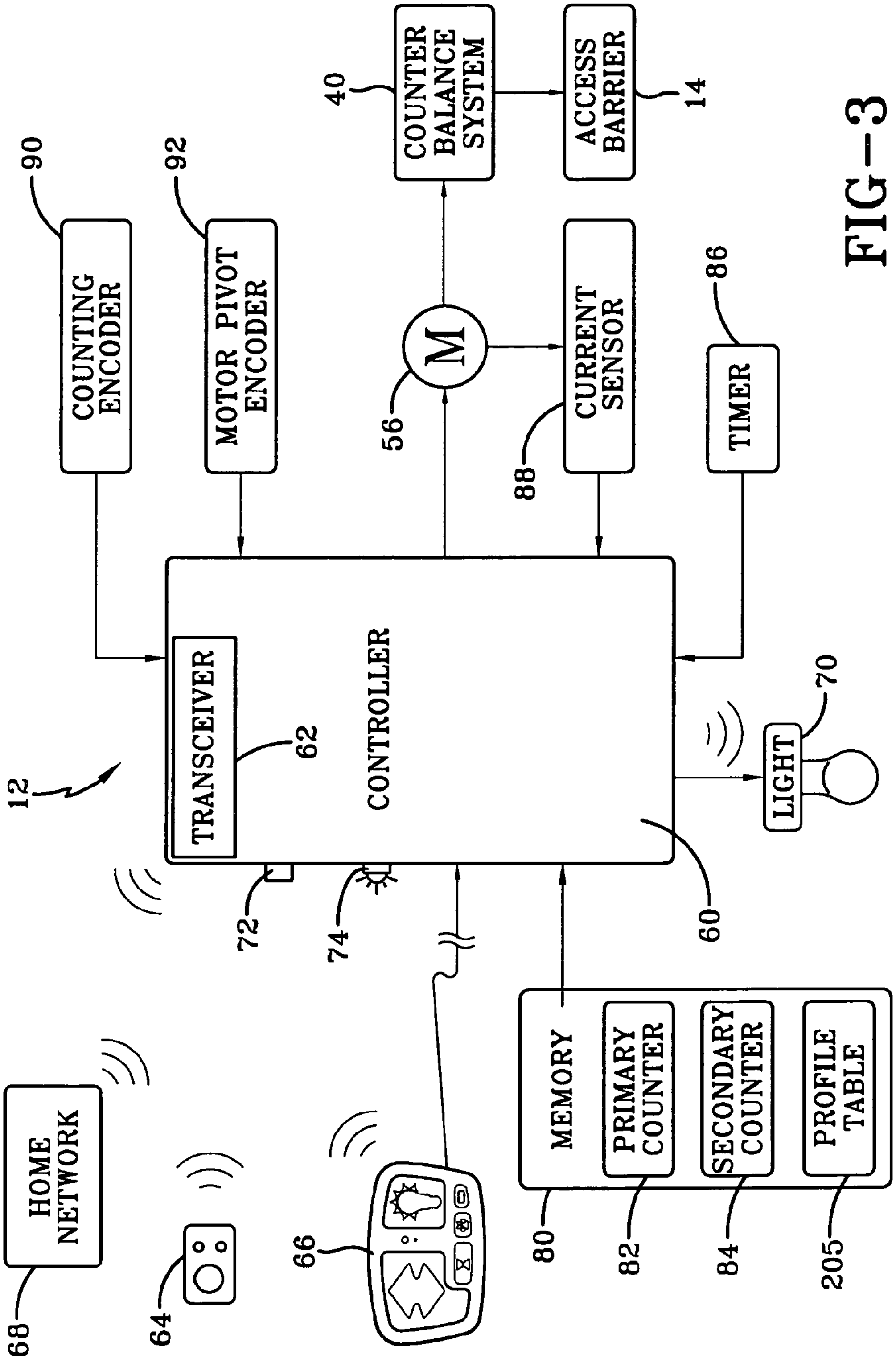
FIG. 3 is a block diagram of the barrier operator including the barrier re-synchronization system according to the present invention.

Continuing to FIG. 3, the barrier operator 12 comprises a controller 60, which maintains the necessary application specific or general purpose hardware, software, and memory for enabling the concepts of the re-synchronization system 10. The controller 60 receives user and sensor input for evaluation, and generates command signals so as to implement the operational features of the barrier operator 12. The controller 60 may comprise a transceiver 62 to allow the controller 60 to receive communication signals from, or to send communication signals to, one or more remote devices that may include a portable wireless transmitter 64, a wireless wall station 66, or a wireless home network 68 along with other devices, appliances, or peripherals coupled thereto. Typically, the portable transmitter 64 may have one or more primary functions that can be invoked at the barrier operator 12, such as an open/close function to actuate the access barrier 14 for example. Additionally, the portable transmitter 64 may have one or more secondary functions that may be invoked to control adjacent or less used access barriers, or lighting fixtures, such as a light 70 for example. The wall station 66, which may be wireless, or directly coupled to the controller 60 by a wire, may also include the same primary or secondary functions discussed with respect to the portable transmitter 64. However, it is also contemplated that the wall station 66 may provide other functions, including but not limited to auto-close, delay-open, delay-close, setting of a pet height for the access barrier, learning other transmitters to the barrier operator 12, and installation procedures used in learning an access barrier to the barrier operator 12.

The controller 60 also includes a program button 72 that places the controller 60 into a learn mode, and allows the controller 60 to be learned to various portable transmitters 64, and wireless wall stations 66. By providing the learn mode, it is ensured that operation of the barrier operator 12 is restricted to only those various transmitters/wall stations 64,66 that have been properly learned to the controller 60. A program light 74 is also provided by the controller 60 to give feedback to the user to denote the status of the learn mode, the status of the controller 60, or status of any of the components associated with the controller 60.

A memory unit 80 is also coupled to the controller 60. The memory unit 80 may be external to the controller 60 as shown in FIG. 3, or the memory unit 80 may be embedded (i.e. embedded memory) within the logic circuitry of the controller 60. In any case, the memory unit 80 may be comprised of either volatile or non-volatile memory, including but not limited to EPROM (electrically programmable read-only memory), EEPROM (electrically erasable programmable read-only memory), Flash, DRAM (dynamic random access memory), SRAM (static random access memory) or the like. Stored in the memory unit 80 are a primary and a secondary counter 82,84 that are capable of being incremented, decremented, and reset to a desired value. The counters 82,84 may comprise particular memory locations that are accessed by the controller 60, such that the values stored therein can be incremented, decremented, or otherwise altered in accordance with the concepts of the present invention. Additionally, a timer 86 may also be coupled to the controller 60. It should be appreciated that the timer 86 may be a separate unit from that of the controller 60, or embedded with the logic circuitry of the controller 60 itself. The timer 86 is utilized by the controller 60 to monitor, measure, and associate the occurrence of various events with a given time duration, which will be discussed more fully below. In addition, the motor drive 56 is coupled to the controller 60, and provides the mechanical drive power to move the access barrier 14 between opened and closed positions via the counterbalance system 40. A current sensor 88 is coupled between the motor drive 56 and the controller 60. The current sensor 88 allows the controller 60 to monitor the current being drawn by the motor drive 56, such that various changes in the operation of the barrier operator 12 may be detected. For example, a fluctuation in motor current detected by the current sensor 88 may cause the barrier operator 12 to timeout, or otherwise stop functioning if an obstacle prevents the access barrier 12 from closing completely.

Figure 4:
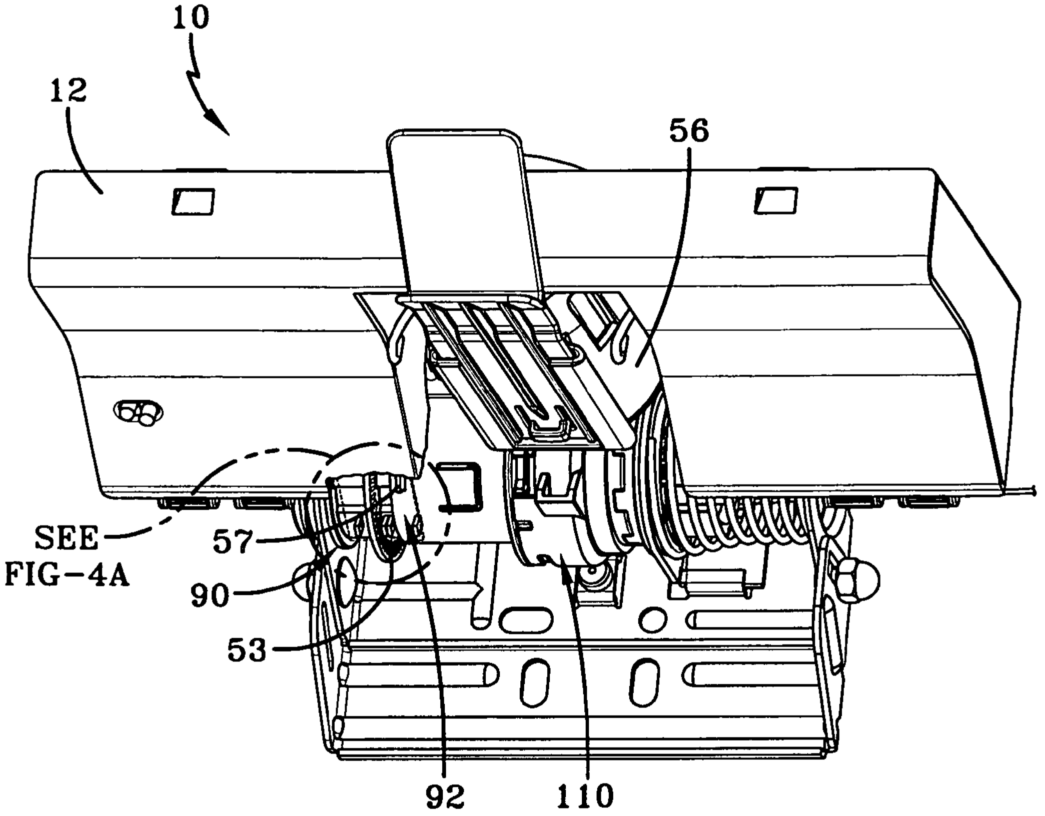
FIG. 4 is a perspective view showing the underside of the barrier operator.
Figure 4A:
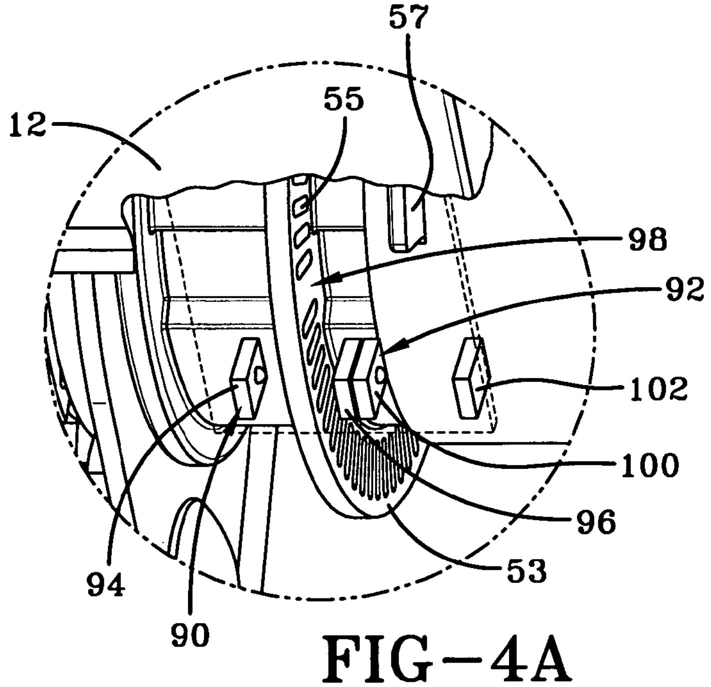
FIG. 4A is an enlarged view of a counting encoder and a motor pivot encoder of the re-synchronization system.

Also coupled to the controller 60 is a counting encoder 90 and a motor pivot encoder 92 that is schematically shown in FIG. 3, and physically shown in FIGS. 4-4A. The counting encoder 90 comprises a counting emitter 94 and a counting receiver 96 that are spaced apart to allow the encoder wheel 53 to rotate therebetween. Specifically, the counting emitter 94 emits a suitable light beam, such as an infrared or laser beam, that is received by the counting receiver 96. However, as the encoder wheel 53 rotates, the slots 55 interrupt the continuous light beam emitted by the counting emitter 94 to generate light pulses. Thus, as the encoder wheel 53 rotates, the counting receiver 96 detects the light pulses, which are counted and processed by the controller 60 to resolve the relative location of the access barrier 14 down to about 0.1 inch. Therefore, the controller 60, by analyzing the number of pulses detected over a given time period as established by the timer 86, is able to ascertain the rotational speed of the encoder wheel 53 and, as such, the speed of the barrier.

Since the spacing between the slots 55 is uniform about the encoder wheel 53, the software maintained by the controller 60 cannot resolve the relationship of each pulse to the location of the drive tube 42. Therefore, if the barrier operator 12 is disconnected from the access barrier 14 and moved, the distance traveled by the access barrier 14 can be determined, but the direction of travel cannot. To overcome this deficiency, the encoder wheel 53 may incorporate a directional marker 98, which allows the controller 60 to determine the travel direction of the drive tube 42 relative to the linear position of the access barrier 14. The directional marker 98 may be in the form of a blocked slot. In other words, in a position where a slot would normally be encountered, the marker is detected by the encoder 90. In essence, the marker 98 is a filled-in slot. Alternatively, the directional marker 98 may be larger or of a different size than the slots 55, and may be interspersed among the slots 55 of the encoder wheel 53 in a symmetrical or uniform arrangement. For example, one directional marker 98 may appear after every ten slots 55. To ascertain the relative movement of the directional marker 98, the counting emitter 94 and the counting receiver 96 are utilized in a manner similar to that discussed above with regard to measuring the speed of the access barrier 12. Specifically, the directional marker 98 is identified by a pulse that is of a longer or different duration than that generated by the slots 55. Once the directional marker 98 has been detected, the controller 60 receives a directional pulse from the counting encoder 90 and associates the rotational direction of the encoder wheel 53 with a particular linear movement of the access barrier 14. In other words, using the directional marker 98 to create light pulses of a longer or different duration, allows the software executed by the controller 60 to determine the location and movement direction of the access barrier 14. In addition, the counting encoder 90 allows the controller 60 to record the pulse signals that are generated for both the speed and direction of the access barrier 14, as the access barrier 14 is manually moved by a user or automatically moved by the barrier operator 12. Although any barrier movement distance can be associated with a light pulse, the present embodiment utilizes a distance of 0.1 inch for each light pulse detected. For example, if the access barrier 14 is disconnected from the barrier operator 12, and the access barrier 14 is manually moved up, the software component of the controller 60 along with the counting encoder 90 may continue to count pulses and locate the directional pulse. For example, when the access barrier 14 is stopped with the pulse counter at a count of 278 pulses, for example, the directional pulse is located at the 270th pulse location. If the access barrier 14 system is manually moved again later, the software component of the controller 60 will expect the directional pulse to appear again eight pulses later given that the access barrier 14 is being pulled downward, or to appear again 56 pulses later if the access barrier 14 is being moved in the upward direction.

Although use of a marker/detector system, such as the slotted encoder wheel 53 and light beam of the counting encoder 90 is disclosed, it will be appreciated that other types of markers could be used. For example, equally spaced magnets of equal field strength could be used in a manner equivalent to the slots 55 wherein a magnet with increased or decreased field strength distinguishable from the other magnets could be used as the directional marker 98. As such, an appropriate Hall-effect sensor or other sensor could be used to detect the passing of the magnets.

Figure 5:
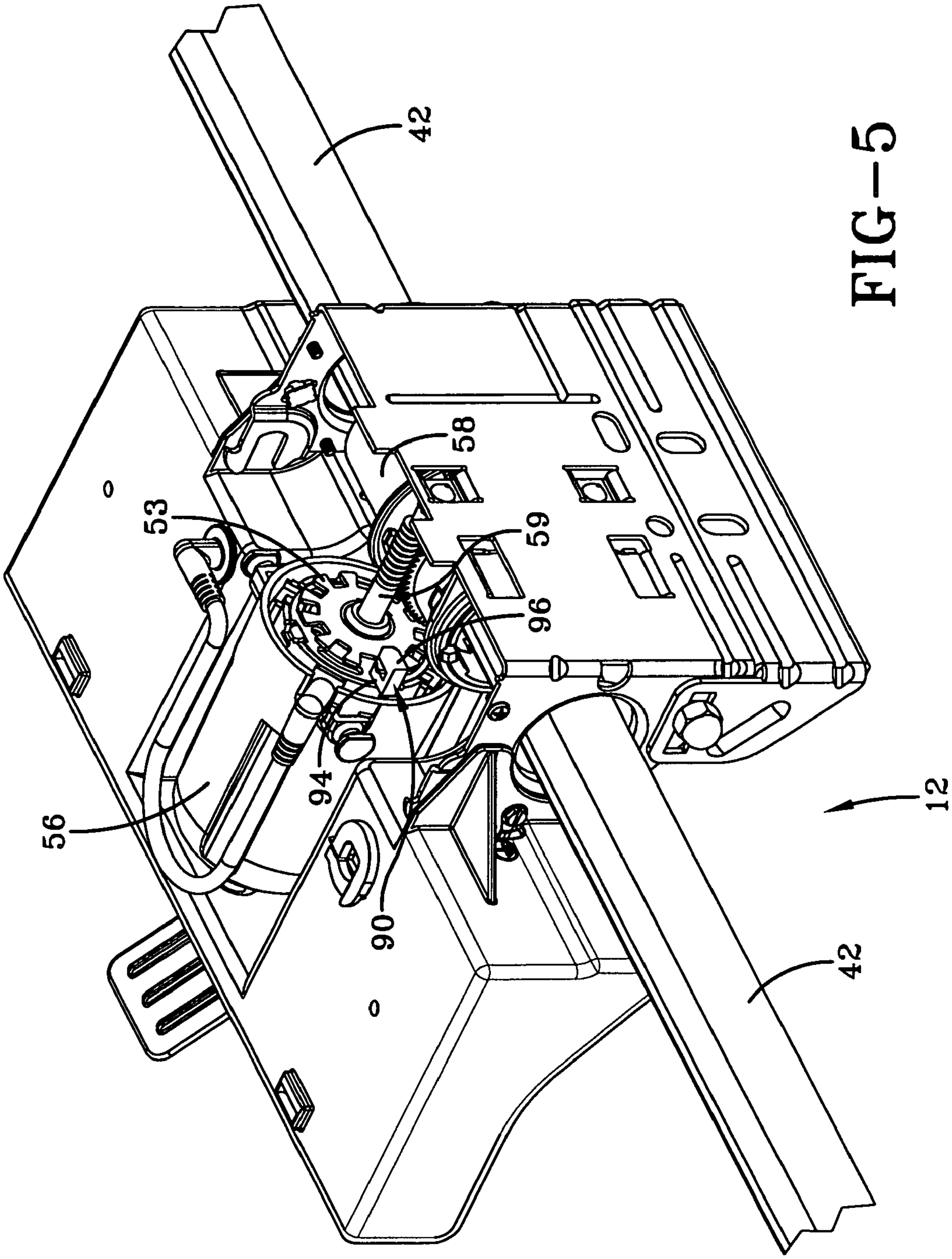
FIG. 5 is a perspective view of the topside of the barrier operator showing an embodiment of the re-synchronization system having an encoder wheel mounted to a shaft extending from a motor drive.

In another embodiment, shown in FIG. 5, the encoder wheel 53 may be mounted to the shaft 59 of the motor drive 56. To measure the speed and direction of rotation of the shaft 59, the counting encoder 90 is suitably mounted about the encoder wheel 53 so as to generate a series of pulses as the shaft 59 rotates the encoder wheel 53 which utilizes an appropriate directional marker.

Figure 6B:
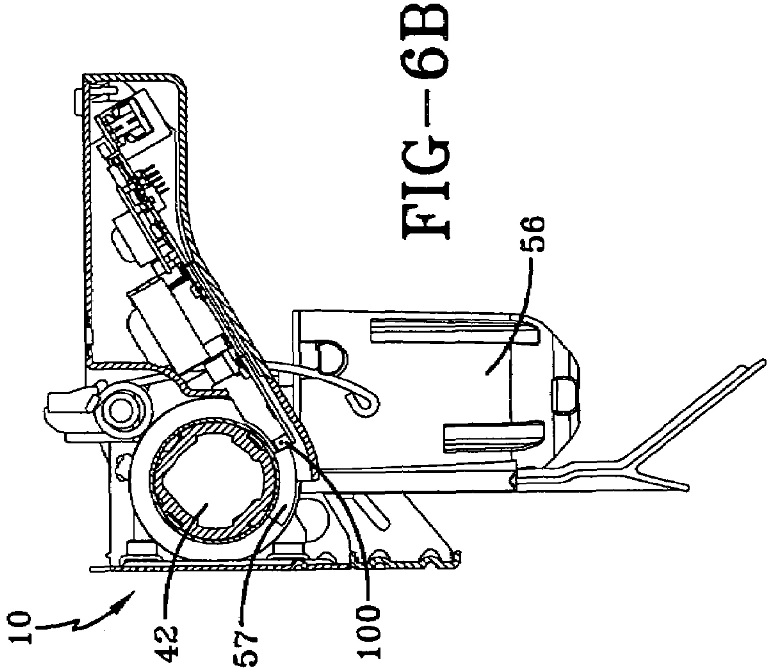
Figure 6C:
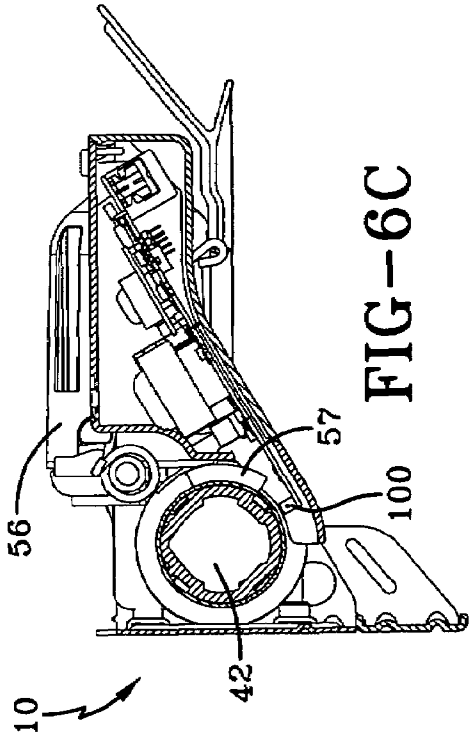
Figure 6A:
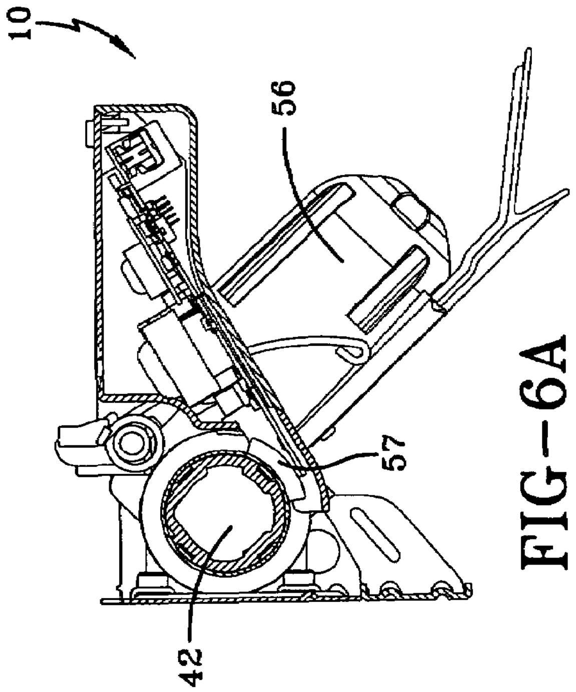

The motor pivot encoder 92 comprises a compliance emitter 100 and a compliance receiver 102, which detects the presence or absence of the blocker tab 57 that is configured to rotate between the compliance emitter 100 and the compliance receiver 102. Specifically, the blocker tab 57 radially or otherwise extends from the gear case cover 58 that is rotatably mounted to a gear case housing 110 that supports the motor drive 56. The compliance emitter 100 is configured to emit a suitable light beam, such as an infrared or laser beam, to be received by the compliance receiver 102. As the access barrier 14 moves into a fully open or fully closed position, or if the access barrier 14 encounters an obstacle, or if the operator is disconnected from the barrier, the mechanical power supplied by the motor drive 56 to drive the drive tube 42, and the associated counterbalance system 40, causes the motor drive 56 and the attached gear case cover 58 to at least partially rotate, as shown in FIGS. 6A-C. As the gear case cover 58 rotates, the blocker tab 57 also rotates between the compliance emitter 100 and the compliance receiver 102.

Generally, when the access barrier 14 is fully opened or fully closed the blocker tab 57 does not block the beam emitted by the compliance emitter 100. However, if an obstruction force that exceeds a predetermined amount is imparted to the access barrier 14 as it travels downward, a biasing force is overcome and the motor drive 56 and the other associated supporting assemblies, including the gear case cover 58 rotate, as shown in FIG. 6A. When this occurs, the rotation of the gear case cover 58 causes the blocker tab 57 to interfere with the light beam generated by the compliance emitter 100. The controller 60, which continuously monitors the motor pivot encoder 92, then generates the appropriate signals to stop the operation of the motor drive 56, so as to prevent the access barrier 14 from moving further.

In the case where the access barrier 14 is moving into a fully closed position, as shown in FIG. 6B, the blocker tab 57 changes from an obstruction indicator to a motor pivot position, and speed indicator. Briefly, during the closing movement of the access barrier 14, the motor drive 56, begins to pivot downward, causing the gear case cover 58 to rotate. The rotation of the gear case cover 58 results in the leading edge of the blocker tab 57 moving so as to interfere with the light emitted from the compliance emitter 100. As the access barrier 14 continues to move into a fully closed position, the trailing edge of the blocker tab 57 moves past the compliance emitter 100, re-establishing the transmission of light between the compliance emitter 100 and the compliance receiver 102, and indicating to the controller 60 that the access barrier 12 is in a fully closed or locked position. Thus, the detection of the leading and trailing edges of the blocker tab 57 results in the controller 60 determining that the access barrier 14 is in a fully closed position.

When the access barrier 14 is actuated from an initially closed position, the motor drive 56 rotates or pivots upwardly and causes the blocker tab 57 to move through the motor pivot encoder 92 in a manner opposite to that discussed with respect to the access barrier 14 being closed. As such, after the leading and trailing edge of the blocker tab 57 has been detected by the motor pivot encoder 92, the controller 60 determines that the access barrier 14 is moving toward the fully opened or operation position, as shown in FIG. 6C.

It should also be appreciated that in one embodiment the presence or absence of the blocker tab 57 may be used to denote that the access barrier 14 is in a fully opened or fully closed position. For example, in one embodiment of the re-synchronization system 10, the blocker tab 57 may be configured so that its leading and trailing edges are not used to determine whether the access barrier 14 is fully open or closed. Rather, the detection or non-detection of the blocker tab 57 by the motor pivot encoder 92 may be used by the controller 60 to determine whether the access barrier 14 is in either a fully opened or fully closed position. For example, the re-synchronization system 10 may be configured to identify that the access barrier 14 is in a fully closed position if the blocker tab 57 is detected by the motor pivot encoder 92 prior to the initial movement of the access barrier 14 from the closed limit position toward the open limit position. Such detection by the motor pivot encoder is sent to the controller which then resets at least the primary count and, if desired, the secondary count. Alternatively, the access barrier 14 may be identified as being in a fully opened position if the blocker tab 57 is not detected by the motor pivot encoder 92 prior to an initial movement of the access barrier 14. It is also evident to one skilled in the art that the detection or non-detection of the blocker tab 57 may be used to signify a fully opened or fully closed access barrier 14, or vice versa.

The primary and secondary counters 82,84 along with the current sensor 88, the counting encoder 90, and the motor pivot encoder 92 form the primary components of the re-synchronization system 10. As discussed previously, the primary and secondary counters 82,84 may comprise various memory locations of the memory 80. Furthermore, the term count as used herein, refers to the numerical representation of the various distances moved (i.e. travel), when the access barrier 14 has been manually moved by an individual or when the access barrier 14 has been moved by the barrier operator 12. As such, the following discussion will be directed to the interrelationship between the various components of the re-synchronization system 10 as well as the steps taken by the re-synchronization system 10 when in operation.

During normal operation of the resynchronization system 10, when the access barrier 14 is in a fully open or fully closed position, the primary and secondary counters 82,84 initially contain equal count values. As used herein, the phrase "operator move" refers to the movement of the access barrier 14 that is initiated by the barrier operator 12. The phrase "manual move" as used herein, refers to any repositioning of the access barrier 14 performed while the access barrier 14 is disengaged from the counterbalance system 40. Thus, after a manual move, the primary counter 82 contains a "measured distance" count value that is equal to the distance measured by the encoder wheel 53 for the prior operator move less the amount of travel completed by any manual repositioning of the access barrier 14 that occurs prior to any subsequent operator move. Should a subsequent operator move be initiated, the measured distance count is decremented (or incremented) in accordance with the amount of travel of the access barrier 14 as it moves upward or downward. The secondary counter 84 prior to any operator move contains a count value, referred to hereinafter as a "travel distance" count value, which is equal to the full travel distance between the closed and opened positions (i.e. distance between the bottom of the access barrier and floor, when the access barrier 14 is fully opened) established by a barrier operator profiling operation that is completed when the barrier operator 12 was installed, and put into service. The details of such profiling operation are set forth in detail in U.S. patent application Ser. No. 11/165,138. The secondary counter 84, in the case of a manual move, is not updated, and is otherwise unaware of any manual movement of the access barrier 14. The interaction between the primary and secondary counters 82,84 and the effect of a manual movement of the access barrier 14 will be fully set forth in the operational steps set forth below.

Figure 7A:
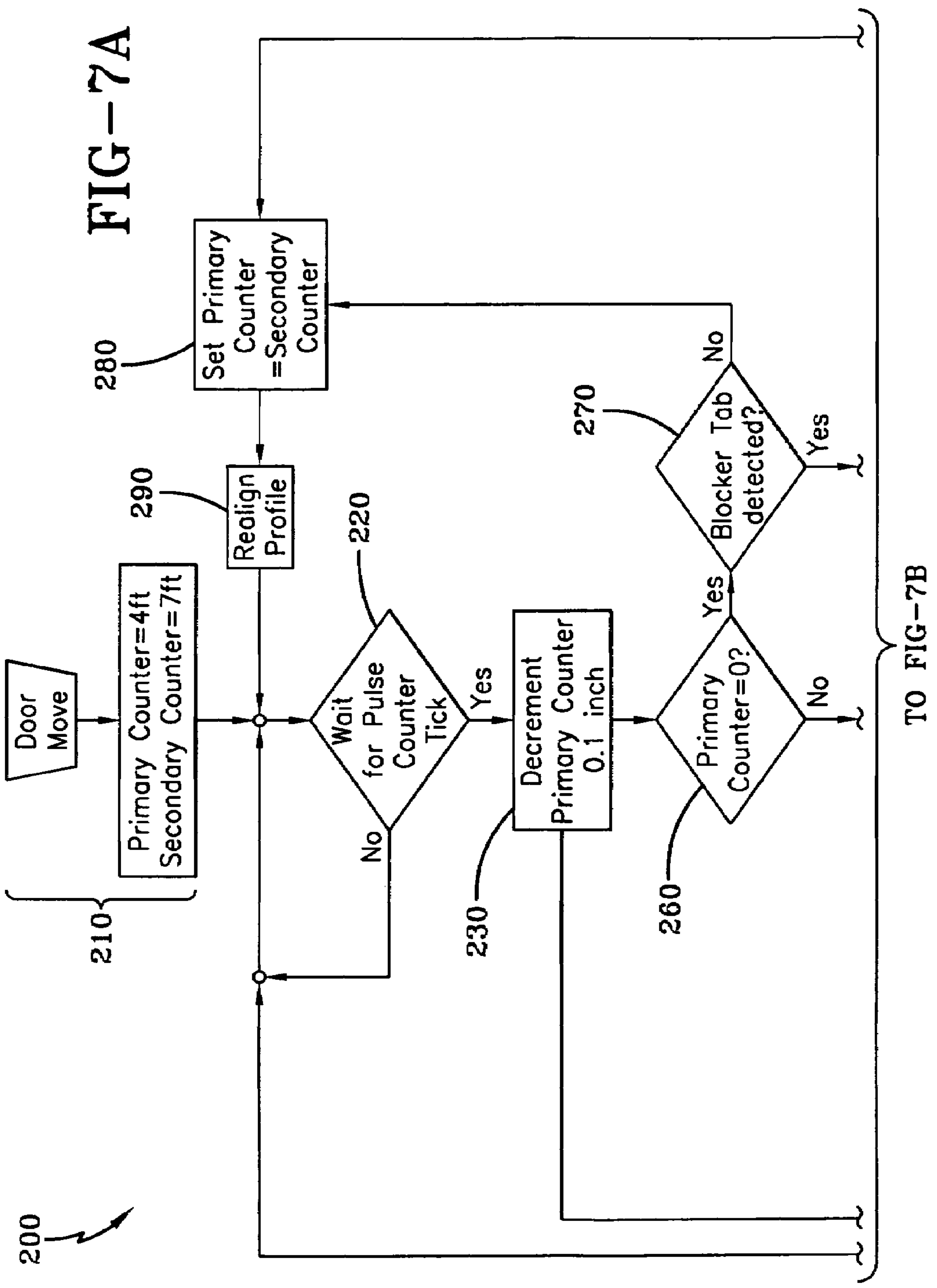
FIGS. 7A and 7B show a flow chart showing the operational steps taken by the re-synchronization system when the access barrier has been manually disengaged, and repositioned.
Figure 7B:
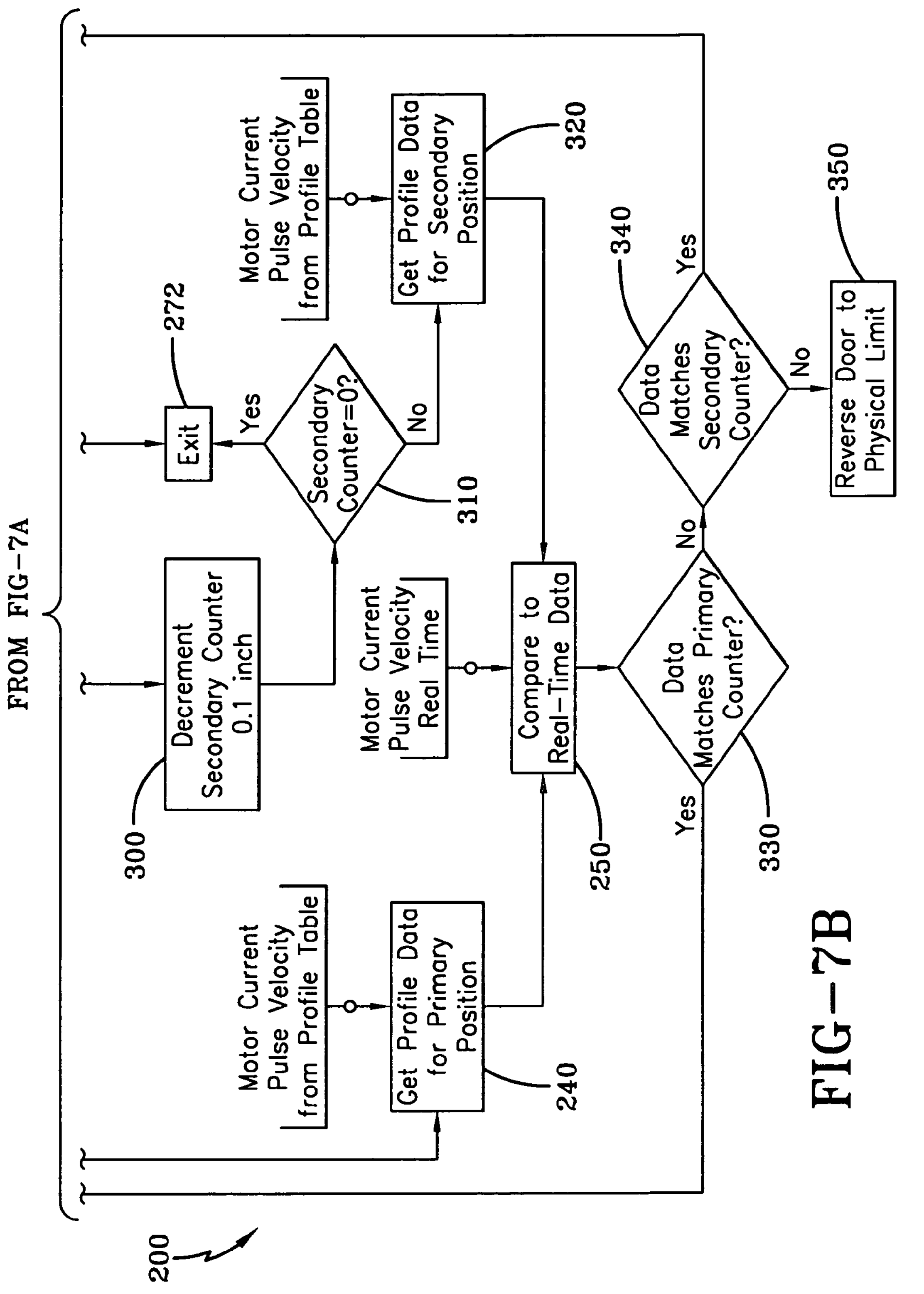

The operational steps taken by the re-synchronization system 10 are generally designated by the numeral 200 as shown in FIG. 7 of the drawings. The following discussion is based on the initial conditions, wherein the operational limits of the access barrier 14 have been profiled by the barrier operator 12 prior to use, and the access barrier 14 has been identified as having seven feet (about 213 centimeters) of travel between its open and closed positions (i.e. the travel distance being measured between the bottom of the access barrier 14 and the floor, when the access barrier 14 is in a fully opened position). This profiled travel distance is stored in a profile table 205 of the memory 80, and utilized by the secondary counter 84 as the "travel distance" count value that is decremented during an operator move. The primary counter 82 contains the "measured distance" count value as previously discussed. Following an operator move, the decremented primary counter 82 is reset to the "measured distance" count that was measured by the counting encoder 90 during the previous completed operator move. Thus, the primary counter 82 is reset with an updated "measured distance" count value after each successive completed operator move. In addition, the secondary counter 84, which is decremented only during an operator move, is reset to the travel distance count after each completed operator move.

Continuing with the operational steps of the process 200, the access barrier 14 is initially in a fully closed position, the primary counter 82 and secondary counter 84 are both equal to the travel distance count, which for the purpose of this example is seven feet as discussed. As previously discussed, the detection or lack of detection of the blocker tab 57 by the motor pivot encoder 92 may be used by the controller 60 as an indicator of the initial position of the access barrier 14. Thus, the commencement of any operator move of the access barrier 14 causes the count values contained in both the primary and secondary counters 82,84 to be decremented in accordance with the amount of travel of the access barrier 14 completed by such operator move.

At step 210, the access barrier 14, is moved into a fully opened position by an operator move, and then subsequently manually moved, such that the bottom of the access barrier 14 is four feet (about 121.9 centimeters) above the ground. Because the access barrier 14 was manually moved to a position four feet above the ground, the counting encoder 90 decrements the primary counter 82 so that it has a current "measured distance" count value of four feet, while the secondary counter 84 continues to have a "travel distance" count value equal to the travel distance of seven feet On the next operator move of the barrier operator 12, the access barrier 14 is driven downward into its closed position, and it is this downward movement that serves as the basis for the following discussion.

Once the access barrier 14 begins to be driven downward by the barrier operator 12 during the operator move, the controller 60 waits for a pulse to be generated from the encoder wheel 53, as indicated at step 220. If a pulse is not produced by the encoder wheel 53, the process 200 continues at step 220 until one is generated and received by the controller 60. However, if a pulse is produced by the encoder wheel 53 and detected by the controller 60, the process 200 continues to step 230, where the primary counter 82 is decremented by 0.10 inches (about 0.254 centimeters), although other decrement values may be utilized. Somewhat simultaneously with step 230, step 240 is preformed wherein the profile data for the current count value contained in the primary counter 82 is obtained from the profile table 205 of the memory 80.

The profile table 205 contains various operating data relating to the operation of the barrier operator 12 and access barrier 14, which is gathered during the profiling step performed during the installation of the access barrier 14 and the barrier operator 12. For example, the profile table 205 may contain data corresponding to specific positions of the access barrier 14 throughout discrete positions of its travel distance. For example, motor current, pulse velocity, barrier speed, motor torque and any other operational parameters may be stored in the profile table for each travel increment of the access barrier 14. After the profile data has been acquired from the profile table 205, it is compared with the sampled motor current, pulse velocity values and the like that have been acquired in real-time by the counting encoder 90, the current sensor 88, and any other sensor linked to the controller, as indicated at step 250. At step 250, the process 200 determines whether there is a match between the profile data and the sampled data. If a match is established, then the process 200 returns to step 220.

Somewhat simultaneously with steps 240 and 250, the process 200 continues to step 260 where the controller 60 determines whether the primary counter 82 has been decremented to a zero value. If the primary counter 82 has been decremented to zero, the process 200 continues to step 270, where the controller 60 determines whether the blocker tab 57 has been detected by the motor pivot encoder 92. Next, if the blocker tab 57 has not been detected, the count value currently stored in the primary counter 82 is changed to the count value stored in the secondary counter 84, thus causing the profile of the access barrier 14 to be realigned as indicated at steps 280, and 290. However, if at step 270, the blocker tab 57 is not detected by the controller 60, the process 200 exits, as indicated at step 272, as the access barrier 14 has been moved down to a fully closed position. However, if the primary counter 82 does not equal zero at step 260, the process 200 moves to step 300. At step 300, the secondary counter 84 is decremented by 0.10 inches, but should not be construed as limiting as any increment value may be used. After the secondary counter 84 has been decremented, the secondary counter 84 is analyzed by the controller 60 to determine if it is equal to zero, as indicated at step 310. If the secondary counter 84 is equal to zero, then the process 200 exits as indicated at step 272. However, if the secondary counter 84 does not equal zero, then the process 200 continues to step 320, where the controller 60 acquires the profile data, from the profile table 205 that corresponds to the current position of the access barrier 14 that is stored as the current count value in the secondary counter 84.

Once the profiles for the current counts of the primary and secondary counters 82,84 have been acquired, the values are compared to the sampled, real-time values of motor current, and pulse velocity, as indicated at step 250. If the profiled data relating to the current count in the primary counter matches the real-time data (motor current, pulse velocity, etc. for example) acquired by the controller 60, the process 200 by way of step 330, continues to step 220 as previously discussed, whereby the operational steps 220-330 are repeated. However, if the profiled data (motor current, pulse velocity, etc.) from the profile table 205 relating to the current count of the secondary counter 84 matches or more closely approximates the sampled, real-time data, then the process 200 by way of step 340, continues to step 280. At step 280 the current count value of the primary counter 82 is changed to the current count value stored in the secondary counter 84, resulting in the realignment of the primary counter 82, as indicated at step 290. However, if at step 340, the controller 60 determines that the profiled motor current and velocity values corresponding to the current count value of the access barrier 14 that is stored in the secondary counter 84 does not match the sampled data, then the process 200 continues to step 350, whereby the barrier operator 12 reverses the direction in which the access barrier 14 is being moved.

It will, therefore, be appreciated that one advantage of one or more embodiments of the present invention is that a re-synchronization system is able to determine the correct amount of movement needed to close or open an access barrier. Still another advantage of the present invention is that the re-synchronization system is able to monitor and compare real-time speed, direction, and motor current values for the access barrier with values that have been profiled prior to the access barrier being put into use. An additional advantage of the present invention is that the re-synchronization system is compatible with pivoting barrier operators.

Although the present invention has been described in considerable detail with reference to certain embodiments, other embodiments are possible. Therefore, the spirit and scope of the appended claims should not be limited to the description of the embodiments contained herein.

What is claimed is:

1. An operator to move an access barrier comprising:

a motor drive;

a counterbalance system selectively engageable with said motor drive, said counterbalance system adapted to move the access barrier between limit positions when engaged by said motor drive or when moved manually;

an encoder wheel associated with one of said motor drive and said counterbalance system, said encoder wheel rotating whenever the access barrier is moved;

a counting encoder associated with said encoder wheel and generating a count signal when said encoder wheel is rotated;

a controller which receives said count signal and which maintains a primary count and a secondary count to determine a position of the access barrier regardless of whether the access barrier is moved by said motor drive or manually; and a profile table maintained by said controller which correlates operational parameters with barrier position, wherein said controller compares data stored in said profile table with actual data generated by said counting encoder to determine which of said primary count and said secondary count to use in determining the position of the access barrier.

2. The operator according to claim 1, wherein said controller re-sets said primary count to a value of said secondary count when real-time operational parameters detected by said controller more closely approximate operational data in said profile table associated with a barrier position associated with said secondary count.

3. The operator according to claim 2, wherein said motor drive is pivotable with respect to said counterbalance system.

4. The operator according to claim 3, further comprising:

a blocker tab carried by said motor drive and pivoting therewith, said motor drive pivoting at least when the barrier moves into the closed position; and a motor pivot encoder associated with said blocker tab and generating a blocker signal when said motor drive pivots, said controller deactivating said motor drive when said blocker signal is received and said primary counter has been decremented to about a zero value.

5. The operator according to claim 4, wherein movement of the barrier from the closed limit position toward an open limit position is detected by said motor pivot encoder and said controller resets at least said primary count.

6. An operator to move an access barrier comprising:
a motor drive;
a counterbalance system selectively engageable with said motor drive, said counterbalance system adapted to move the access barrier between limit positions when engaged by said motor drive or when moved manually;
an encoder wheel associated with one of said motor drive and said counterbalance system, said encoder wheel rotating whenever the access barrier is moved;
a counting encoder associated with said encoder wheel and generating a count signal when said encoder wheel is rotated; and
a controller which receives said count signal and which maintains a primary count and a secondary count to determine a position of the access barrier regardless of whether the access barrier is moved by said motor drive or manually;
wherein movement of the barrier in one direction is detected by said counting encoder and said controller increments said primary count and said secondary count, and wherein movement of the barrier in another direction is detected by said counting encoder and said controller decrements said primary count and said secondary count.

7. The operator according to claim 6, wherein said controller adjusts said primary counter and said secondary counter when said counterbalance system moves the access barrier.

8. The operator according to claim 7, wherein said controller adjusts only said primary counter when said counterbalance system is disengaged from said motor and the access barrier is moved.

9. The operator according to claim 6, wherein said encoder wheel provides a directional marker detectable by said counting encoder which generates a directional pulse received by said controller to determine directional movement of the barrier.

10. A re-synchronization system for an access barrier comprising:
a counterbalance system having a rotatable drive tube that carries an encoder wheel, said drive tube adapted to move the access barrier between limit positions;
a motor drive selectively coupled to said counterbalance system, said motor drive adapted to engage said drive tube;
a counting encoder to detect the movement of said encoder wheel as said access barrier moves between open and closed positions; and
a controller having a memory that maintains a primary counter, a secondary counter, and a profile table containing a plurality of profiled data, said controller coupled to said counting encoder and said motor drive, wherein said primary counter stores a primary count equal to the measured travel count less a manual move count if any, and said secondary counter stores a travel distance count acquired from said profile table;
wherein upon the start of each operator move, said primary count and said secondary count are decremented in accordance with the movement of said encoder wheel, said controller collecting sample data from said counting encoder,
whereby after each successive decrement, said profile data corresponding to each decremented primary count and said secondary count are each compared to said sampled data, whereupon if said sampled data match the profiled data corresponding to said primary count, said operator move continues, but if said sampled data matches said profile data corresponding to said secondary count, then said primary counter is loaded with said secondary count, and the operator move of the access barrier is completed in accordance with said primary counter.

11. The re-synchronization system of claim 10, further comprising:
a blocker tab carried by said motor drive, said blocker tab rotating as said access barrier moves between open and closed positions; and
a motor pivot encoder coupled to said controller, said motor pivot encoder adapted to detect movement of said blocker tab,
wherein if movement of said blocker tab is detected, and said primary count is equal to zero, then said barrier operator is deactivated by said controller.

12. The re-synchronization system of claim 10, wherein said profiled data comprises the current draw of said motor drive.

13. The re-synchronization system of claim 12, wherein said sampled data comprises the current draw of said motor drive.

14. The re-synchronization system of claim 10, wherein said profiled data comprises the pulse velocity of said encoder wheel.

15. The re-synchronization system of claim 14, wherein said sampled data comprises the pulse velocity of said encoder wheel.

16. A method for re-synchronizing an access barrier with a barrier operator comprising:
providing profile data associated with a plurality of positions along the travel of said access barrier;
providing a primary counter and a secondary counter, said secondary counter maintaining a travel distance count;
performing a first operator move, wherein said primary counter maintains a measured distance count;
performing a manual move of said access barrier to an intermediate position between opened and closed positions, wherein said measured distance count maintained in said primary counter is updated to reflect the change in position of said access barrier;
performing a second operator move of said access barrier;
updating said measured distance count maintained in said primary counter by an incremental value, said incremental value associated with the relative positional change of said access barrier during said second operator move of said access barrier;
updating said travel distance count stored in said secondary counter by said incremental value;
generating real-time data associated with a plurality of positions along the travel of said access barrier; and
comparing said profiled data corresponding to said updated measured distance count with said real-time data, wherein said method returns to said first updating step if said profiled data and said real-time data matches.

17. The method of claim 16, further comprising:
comparing said profiled data corresponding to said updated travel distance count with said real-time data if no match if made in said first comparing step, wherein said updated travel distance count value is stored in said primary counter if said profiled data matches said real-time data.

18. The method of claim 17, further comprising:

reversing the movement of said access barrier if no match is made at said second comparing step.

19. The method of claim 16, further comprising:

checking whether a blocker tab has been detected by said barrier operator after first updating step, if said primary counter maintains a count of zero.

20. The method of claim 19, further comprising:

storing said updated travel distance count value in said primary counter if said blocker tab has not been detected by said barrier operator.

21. The method of claim 16, further comprising:

exiting said method if after said second updating step said secondary counter maintains a count of zero.

* * * * *